A. T. POSTELWAIT.
BOLL HULLER AND COTTON CLEANER.
APPLICATION FILED JUNE 22, 1910.
1,006,594.
Patented Oct. 24, 1911.
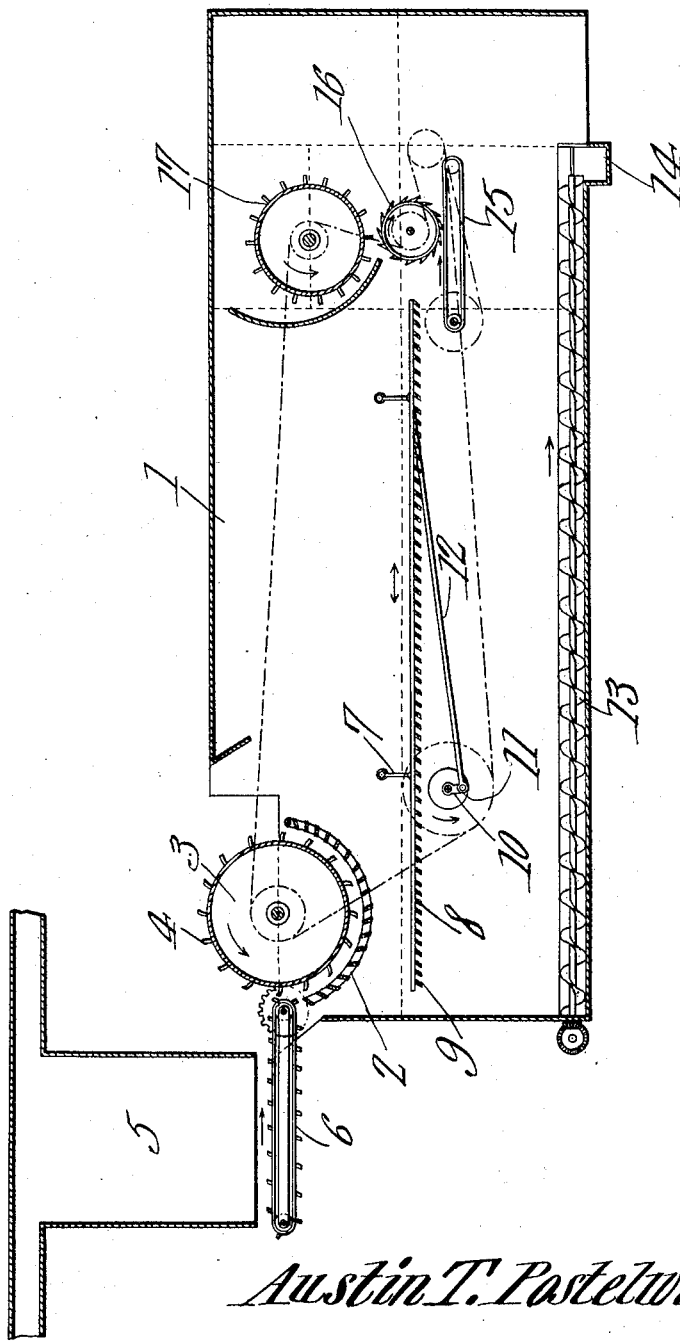
Austin T. Postelwait,
Inventor
by C. A. Snow & Co.
Attorneys

UNITED STATES PATENT OFFICE.

AUSTIN T. POSTELWAIT, OF RED SPRINGS, TEXAS.

BOLL-HULLER AND COTTON-CLEANER.

1,006,594.

Specification of Letters Patent. Patented Oct. 24, 1911.

Application filed June 22, 1910. Serial No. 568,354.

*To all whom it may concern:*

Be it known that I, AUSTIN T. POSTELWAIT, a citizen of the United States, residing at Red Springs, in the county of Baylor and State of Texas, have invented a new and useful Boll-Huller and Cotton-Cleaner, of which the following is a specification.

This invention relates to a boll huller and cotton cleaner and it consists in the novel construction and arrangement of its parts as hereinafter shown and described.

The object of the invention is to provide a simple apparatus adapted to operate upon boll cotton for the purpose of breaking the hulls and stems from the cotton and for separating said hulls and stems from the cotton and delivering the cotton in clean condition ready to be ginned.

With the above objects in view the apparatus includes a casing at the forward end of which is located a slatted concave over which is journaled a cylinder for rotation. A feeding device is provided for delivering the material to the said concave and cylinder. A grid is mounted for reciprocatory movement within the casing and consists of a series of inclined slats. A conveyer is located below the said grid and is adapted to thrust the material which passes through the same and to convey the said material to a discharge outlet provided in the casing. An endless belt is mounted for orbital movement at the delivery end of the said grid and a series of saws is located over the upper run of the said belt and is adapted to receive material from the same. Doffing brushes are provided for removing the material from the saws.

In the accompanying drawings, the figure is a vertical longitudinal sectional view of the boll cotton cleaning apparatus.

The boll cotton cleaner consists of a casing 1 having at one end a concave 2 formed by a series of spaced slats. A cylinder 3 is journaled for rotation over the concave 2 and is provided with a series of radially disposed fingers 4. A chute 5 is located adjacent one end of the casing 1 and a feeder belt 6 is located under the lower end of the said chute and is so arranged that its upper run moves toward the cylinder 3. Hangers 7 are pivotally supported in the casing 1 and a grid 8 is pivotally connected to the lower end of the said hangers. The said grid 8 consists of a series of inclined slats 9 which are spaced from each other. A crank shaft 10 is journaled for rotation in the casing below the grid 8 and the cranks 11 of the said shaft are operatively connected with the said grid by means of pitman rods 12. A worm auger 13 is located in the bottom of the casing and is adapted to force material which passes through the grid 8 toward a discharge outlet 14 provided in the casing 1. A belt 15 is mounted for movement below the delivery end of the grid 8 and the upper run of the said belt moves away from the said grid. A series of saws 16 are journaled for rotation above the upper run of the belt 15 and are adapted to receive material from the said belt. A doffing brush 17 is journaled for rotation in the casing above the series of saws 16 and is adapted to remove the cotton from the teeth of the saws 16.

In operation the apparatus works as follows: The boll cotton with the hulls and stems attached are passed into the chute 5 from which the material falls upon the upper run of the feed belt 6. The said belt conveys the material toward the cylinder 3 which engages the fiber of the material and carries the bolls down against the upper edges of the slats constituting the concave 2. As the material is carried against the slats forming the said concave the hulls and the stems are broken from the cotton and the said hulls and stems pass down through the spaces between the slats while the cotton is carried to the inner edge of the concave 2 and falls over upon the upper part of the grid 8. By reason of the fact that the said grid is reciprocating the material is worked along the same toward the belt 15. As the material passes over the said grid the hulls and stems fall down through the spaces between the slats 9 and are engaged by the worm auger 13 and conveyed to the casing outlet 14. When the cotton is delivered upon the upper run of the belt 15 it is carried toward the series of saws 16 and the teeth of the said saws engage the fiber of the cotton and carry the cotton up, thus subjecting it to a whipping action which will remove any grit from the same. When the cotton is encountered by the doffing brush 17 it is swept from the teeth of the saws 16 and passed out beyond the end of the casing 1 in a cleansed condition. Any suitable means may be provided for driving the operative parts of the apparatus.

Having described the invention what I claim as new and desire to secure by Letters Patent is:

The combination with a feeder mechanism, of a boll huller and cotton cleaner, comprising a casing provided with an opening at the upper end thereof, a boll breaking mechanism located at the open end of said casing, a horizontally disposed advancing frame and sifting device hung intermediate of the top and bottom of the casing and longitudinally thereof, the forward end thereof being directly below the boll breaking mechanism, and adapted to receive the cotton and broken bolls therefrom, an endless conveyer belt located at the opposite end of said frame, below and parallel therewith and having one end overlapping the same to receive the cotton from the sifting frame, a series of saws mounted for rotation above and intermediate of the length of the conveyer belt adapted to receive the cotton placed thereon and carried upwardly, a doffing brush journaled directly above the rotating saws and adapted to receive the cotton thrown upwardly from said saws, and a curved chute coacting with said doffing brush to assist in carrying the cotton away from the saws and doffing brush.

In testimony that I claim the foregoing as my own, I have hereto affixed my signature in presence of two witnesses.

AUSTIN T. POSTELWAIT.

Witnesses:
C. M. RUSSEY,
J. L. PENNINGTON.

---

Copies of this patent may be obtained for five cents each, by addressing the "Commissioner of Patents, Washington, D. C."